July 12, 1955
D. J. BAUER
2,712,784
JOINTER DEVICE FOR PLOW
Filed July 23, 1954
3 Sheets-Sheet 1
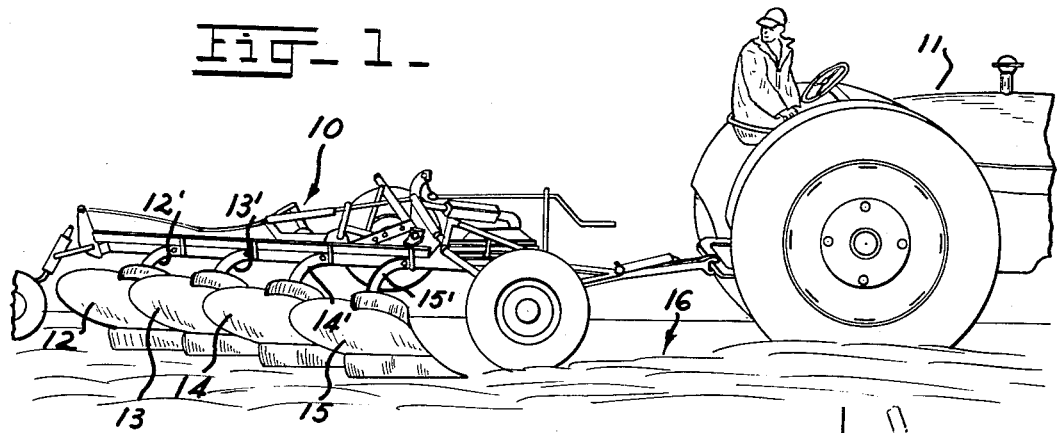
Fig. 1.
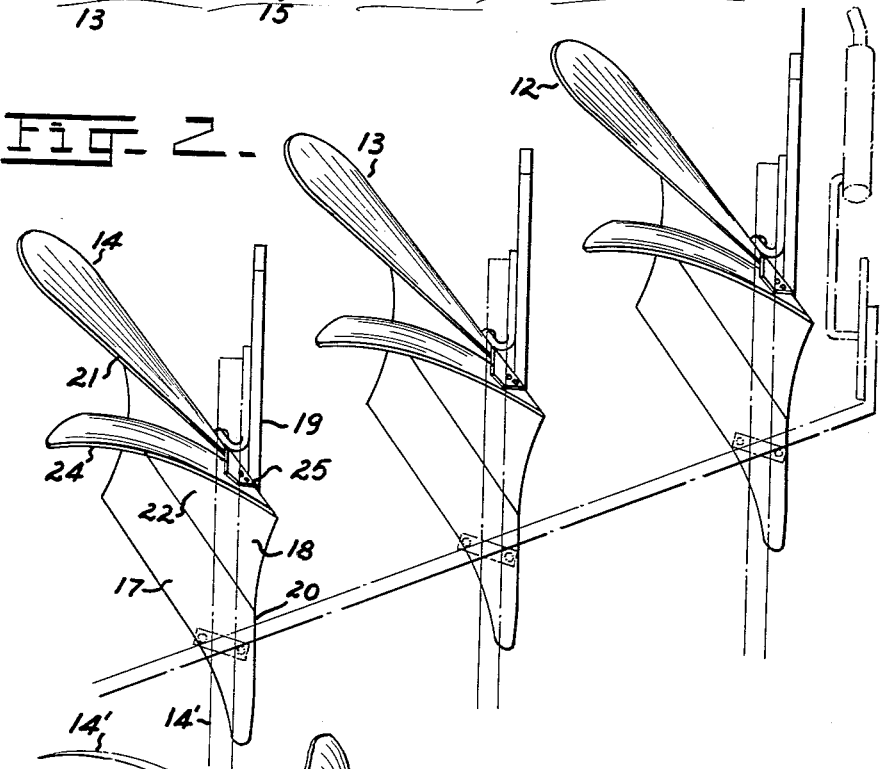
Fig. 2.
Fig. 3.
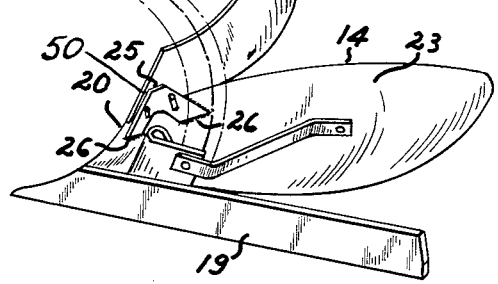
INVENTOR.
DONALD J. BAUER
BY Toulmin & Toulmin
ATTORNEYS July 12, 1955     D. J. BAUER     2,712,784
JOINTER DEVICE FOR PLOW
Filed July 23, 1954     3 Sheets-Sheet 2
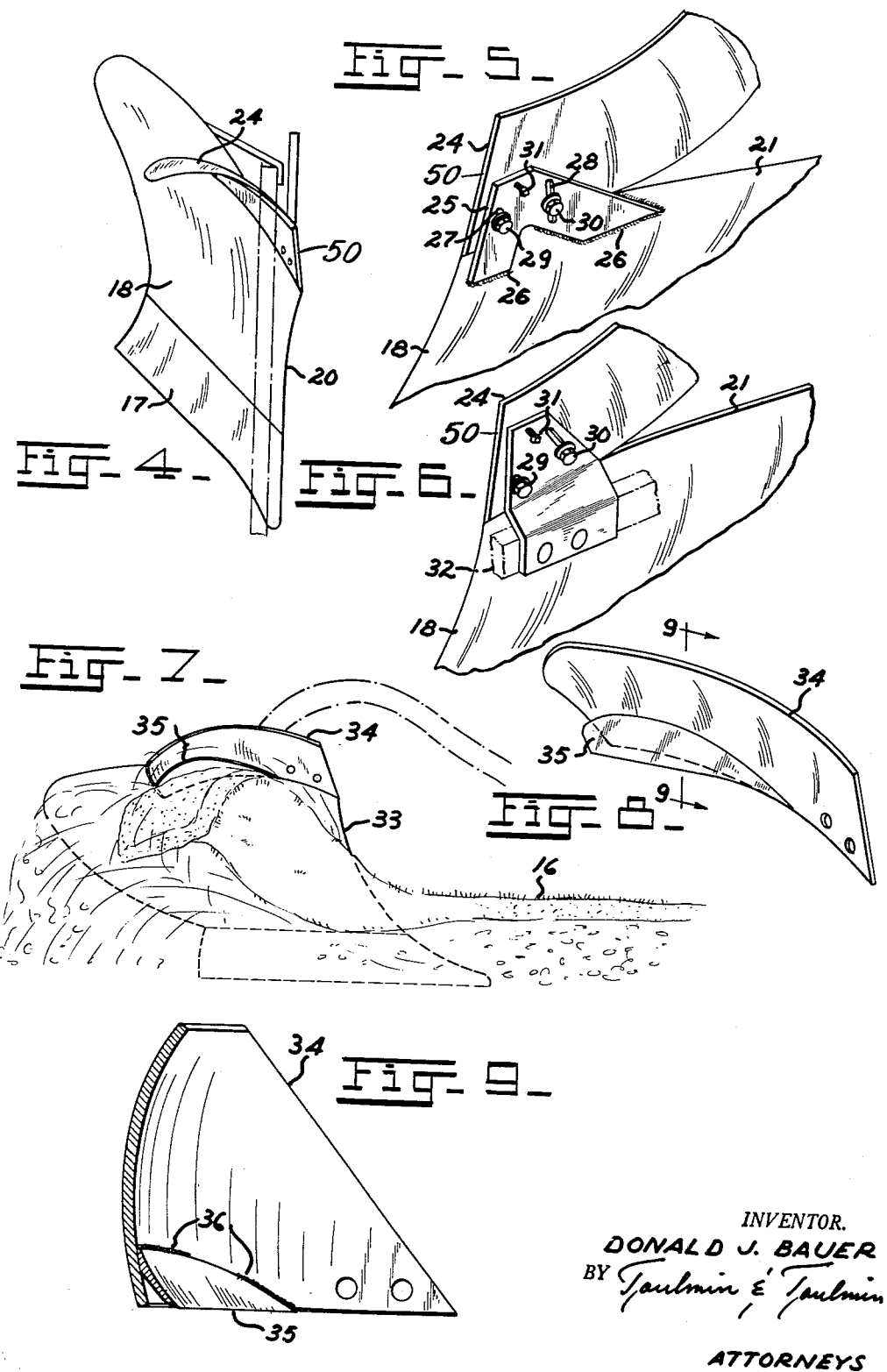
INVENTOR.
DONALD J. BAUER
BY Toulmin & Toulmin
ATTORNEYS July 12, 1955
D. J. BAUER
2,712,784
JOINTER DEVICE FOR PLOW
Filed July 23, 1954
3 Sheets—Sheet 3
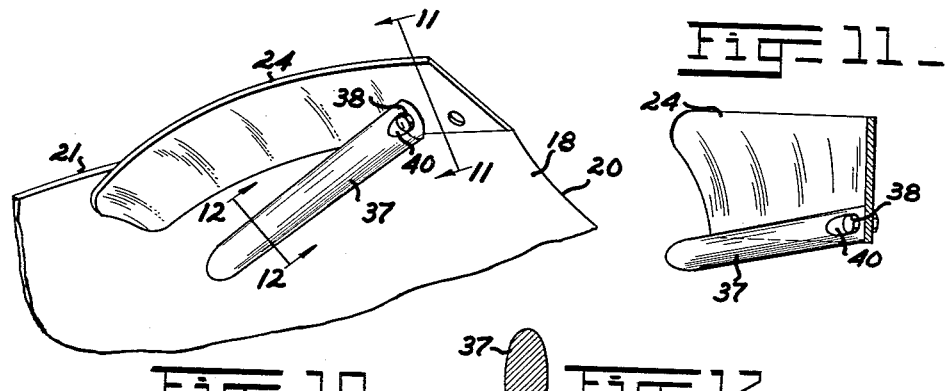
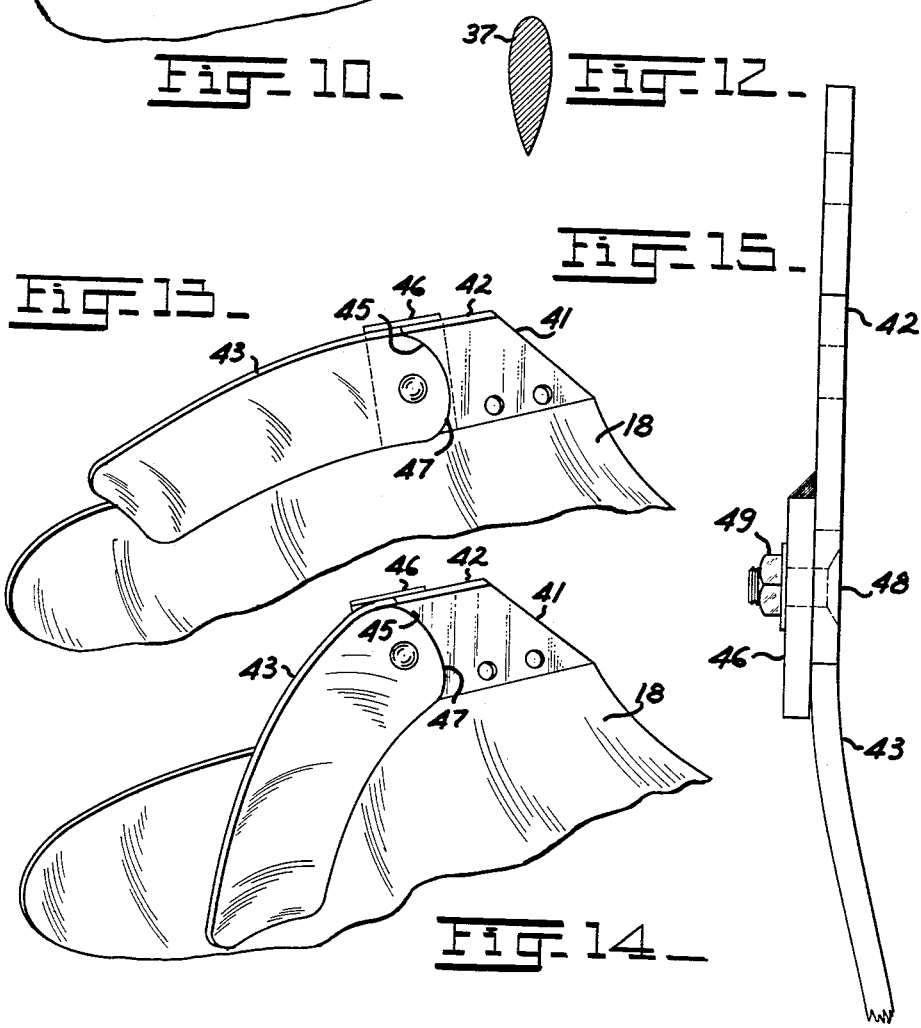
INVENTOR.
DONALD J. BAUER
BY Toulmin & Toulmin
ATTORNEYS United States Patent Office 2,712,784
Patented July 12, 1955

2,712,784

JOINTER DEVICE FOR PLOW

Donald J. Bauer, Norwalk, Ohio

Application July 23, 1954, Serial No. 445,287

2 Claims. (Cl. 97—211)

This invention relates to an improvement in agricultural machinery, more particularly, to a jointer device for plow and the structure for attaching said jointer device to a moldboard plow.

Various devices have been previously proposed for use in conjunction with a plow to turn the top surface of the soil over during the plowing operation. These devices are referred to as jointers and their purpose is to cover all matter which might be found on the surface of the ground. This matter usually comprises stalks of previous crops, stones, sticks, branches and the like. By turning over the ground so that the accumulated organic matter on the surface of the soil may be intermixed with the soil beneath the surface thereof, the soil is further enriched through this organic matter. In addition, by turning over all the material on the top of the soil a plowed field results that has a neat appearance since no trash is left upon the plowed surface. Also, the plowed field does not have any loose trash thereon which might interfere with subsequent operation of a drill or planter.

Jointer devices have taken many forms. A conventional jointer comprises a jointer device attached to the plow beam immediately forward of the plow itself. This device, however, was not particularly effective in covering matter on the surface of the soil. This type of jointer also imposes a load on the draft means pulling the plow.

Jointer devices of various kinds have been proposed in the past, which jointers were for attachment to the plow itself. These jointers again were not particularly effective and were usually so cumbersome in construction that it was rather difficult to attach them to the plow.

The present invention provides a jointer which is readily attached by a single bracket to the plow. In addition, this jointer of the present invention is so designed that it does an effective job of turning over the top of the soil. Furthermore, the present jointer may be fitted to almost all makes of plows. Because of its simple design this jointer is very simple in construction and, consequently, relatively inexpensive.

The jointer construction disclosed as this invention essentially comprises a curved deflector plate which is attached by means of a plate-like bracket to the moldboard of a plow. Means are provided on the bracket to adjustably position the jointer. The jointer is so located on the plow that the front edge of the jointer is a continuation of the cutting edge of the plow. The forward portion of the jointer is substantially flush with the furrow side of the plow and the rearward portion of the jointer curves outwardly and over the far side of the plow. This invention results in a jointer device which is extremely simple to attach to a plow and which does a most satisfactory and effective job of covering matter on top of the soil when plowed. Several modifications of the attaching brackets are also disclosed. In addition, several constructions are disclosed which enable the jointer to be adjustably positioned.

It is, therefore, the principal object of this invention to provide an improved jointer device for attachment to a plow.

It is another object of this invention to provide an improved structure for attaching a jointer device to a moldboard plow.

It is a further object of this invention to provide a jointer device which may be readily attached to a moldboard plow and which will then effectively cover all material on the surface of the ground during the plowing operation.

It is an additional object of this invention to provide a jointer device which is attached by a simple bracket to a plow and which bracket is adapted to adjustably position the jointer device.

It is still another object of this invention to provide an improved method of covering material which is on the surface of the ground when plowing.

Other objects and advantages of this invention will become apparent upon reference to the following description when taken in conjunction with the accompanying drawings wherein:

Fig. 1 is an overall view of a multi-unit plow in operation with each plow unit incorporating this invention;

Fig. 2 is a top plan view of several plows illustrated in Fig. 1;

Fig. 3 is a perspective view looking at the land-slide side of a plow disclosed in Fig. 1;

Fig. 4 is a forward perspective view of a single plow disclosed in Fig. 1;

Figs. 5 and 6 show in detail the brackets employed to attach the jointer device to the plow;

Fig. 7 is a side elevational view of a plow incorporating a modified form of the jointer device disclosed in Fig. 4;

Fig. 8 is a perspective view of the modified jointer device disclosed in Fig. 7;

Fig. 9 is a sectional view taken along 9—9 in Fig. 8;

Fig. 10 is a perspective view of a portion of a plow in which the jointer device has a wing extending therefrom;

Fig. 11 is a sectional view taken along 11—11 in Fig. 10;

Fig. 12 is a sectional view taken along 12—12 in Fig. 10;

Fig. 13 is a perspective view of a modification of the jointer device which is particularly adapted for readily varying the angle thereof with the plow;

Fig. 14 is a perspective view of the jointer device illustrated in Fig. 13 showing the jointer device in an adjusted position; and Fig. 15 is a top plan view of the modified jointer device illustrated in Fig. 13.

Returning now to the drawings, more particularly to Fig. 1 wherein like reference symbols indicate the same parts throughout the various views, 10 indicates generally a plow which is being towed by a conventional tractor indicated generally as 11. The multi-unit plow 10 comprises a plurality of plows 12 through 15. Each of the plows 12 through 15 is constructed in accordance with this invention. The plows 12 through 15 are attached by means of plow beams 12′ through 15′ respectively to the frame of the multi-unit plow 10. As illustrated in Fig. 1 the plows are about to plow the soil indicated as 16.

Proceeding now to Fig. 2 it can be seen that each of the plows 12, 13 and 14 are of the conventional type. As all these plows are similar, plow 14 will be described in detail and it should be borne in mind that the same construction is employed on each of the remaining plows.

Plow 14 is of the moldboard type and comprises a plowshare 17, a moldboard 18 and a landslide 19 attached to the rear of the plow. The leading edges of the plowshare 17 and the moldboard 18 form a cutting edge 20, The top edge 21 of the moldboard 18 is arcuate in the conventional manner of the moldboard plow. As is conventional, the concave curved surface of the plow forms a furrow side 22 and the rear face of the plow forms a landslide side 23.

In order to cover the material which is on the surface of the ground during the plowing operation, a jointer device 24 having a leading edge 50 is mounted upon the top edge 21 of the plow. The jointer device 24 is mounted to the plow by means of a bracket 25 which is essentially triangular in shape. The bracket 25 is rigidly attached to the landslide side 23 of the plow adjacent the cutting edge 20 and the top edge 21 of the moldboard 18. It is preferable that the bracket 25 be secured to the moldboard by a plurality of welds indicated at 26. However, if desired, the bracket may be bolted or fastened by any other suitable means to the moldboard. Fig. 5 shows in detail the mounting of the jointer 24 upon the moldboard 18. It is pointed out that the leading edge 50 and the cutting edge 20 form an angle which approaches a substantially smooth curve. It can be seen in Fig. 5 that the bracket 25 has a pair of slots 27 and 28 which are of an equal length. The slots 27 and 28 receive bolts 29 and 30, each of which is attached to the landslide side of the jointer 24. By tightening the bolts 29 and 30 against the bracket 25, the jointer 24 may be pivoted so that the curved line formed by the leading edge 50 of the jointer 24 and the cutting edge 20 may be broken and the angle formed of the leading edge 50 and the cutting edge 20 may be varied. This will result in varying the distance of the rearward portion of the jointer above the surface of the ground.

A further adjustment by which the angle formed by the face of jointer and the furrow side of the plow may be varied is also disposed on the bracket. This adjustment comprises a setscrew 31 threadedly received within a hole in the bracket 25 and having its end in contact with the landslide face of the jointer device. This adjustment serves to vary the height to which the plowed soil is thrown.

It may be clearly seen in Fig. 4 that a forward portion of the jointer 24 is substantially flush with the furrow side 22 of the moldboard. The rearward portion of the jointer is curved outwardly with a decreasing radius of curvature and over the furrow side of the moldboard in the manner substantially as shown in Fig. 4. By being curved in this manner it can be seen that the jointer 24 acts as a deflector for the dirt which is turned up by the plow.

Fig. 6 shows an alternative structure for securing the bracket 25 to the plow. In Fig. 6 a member 32 which is rectangular in cross-section may be either welded to the moldboard or merely spaced between the bracket and the moldboard substantially in the manner illustrated. In this construction it can be seen that the bracket is not flat but has portions thereof in separate planes, one plane of which engages the jointer and the other plane engages the member 32. The jointer plane at the bracket is then fastened to the jointer by bolts as described in connection with Fig. 5. The other plane at the bracket is secured to the moldboard 18 by bolts or rivets passing through the member 32.

In Fig. 7 there is shown a modified form of a jointer device. In Fig. 7 the plow indicated as 33 has mounted thereon a jointer device 34. The jointer device 34 may be mounted by use of the bracket 25 as previously described in connection with Figs. 2–5. There is an additional member 35 mounted along the lower portion of the jointer device 34. As may be best seen in Fig. 9, the member 35 extends angularly from the surface of the jointer device 34. The lower edge of member 35 extends downwardly to the vicinity of the lower edge of the jointer device 34. The member 35 may be attached to the jointer device 34 by means of welds 36 as illustrated in Fig. 9. Any other suitable means of attachment may be employed if so desired.

With the jointer device 34 the earth is turned in a manner as schematically illustrated in Fig. 7. It can be thus seen that the member 35 serves as a sod cutter and assists in getting the sod down into the furrow where it will be covered with earth.

In Fig. 10 there is shown a jointer device 24, which may be similarly attached by bracket 25 as described previously in connection with Fig. 2. Fig. 10, however, shows the jointer device with the addition of a wing 37. The wing 37 has a tear drop cross-section as illustrated in Fig. 12. The wing 37 is attached at one end thereof by means of a bolt 38 to the furrow side of the jointer device 24. The wing 37 is attached to the jointer device 24 in such a manner that it extends angularly from the jointer device 24 over the furrow side 22 of the plow. The wing structure 37 has been found to be especially useful for cutting sod and the like similarly to the member 35 described above. The wing element 37 is so affixed to the jointer device that it approaches the earth at an angle between broadside and edgewise. The leading edge of the wing element 37 is sharpened so it has a good cutting action.

As shown in Figs. 10 and 11, the bolt 38 is positioned through an aperture 39 (not shown), which aperture extends from the bottom of the wing 37 to a groove 40 located in the face of the wing 37. It can be seen at once that the wing 37 may be made to extend from the jointer device at various angles by constructing the wing with a predetermined angle between the end of the wing which engages the jointer and the longitudinal axis of the wing.

In Fig. 13 there is illustrated a jointer device 41 which is another modification of this invention. The jointer device 41 comprises a forward portion 42 and a rearward portion 43. The forward portion 42 is substantially flat with the furrow side of the moldboard and may be secured to the moldboard by means of the bracket 25 as described in connection with Figs. 2–5. The rearward portion 43 curves outwardly and over the furrow side of the moldboard in a manner which may be seen in Fig. 15.

The forward portion 42 of the jointer device 41 has an arcuate rear edge 45. There is a plate-like member 46 attached, preferably by welding, to the rear face of the forward portion 42 in such a manner that a portion of the member 46 extends beyond the rear edge 45. The rearward portion 43 of the jointer device 41 has an arcuate forward edge 47 whose curvature is such as to enable the forward edge 47 to cooperate with the rear edge 45. The rearward portion 43 of the jointer device is pivotally mounted by means of a bolt 48 and a nut 49 to the plate-like member 46.

Thus it can be seen that with this structure the relation of the jointer device with the plow may be easily varied merely by pivoting and fixing in position the rearward portion of the jointer device.

From the preceding description of the structure of this invention it will be apparent that the jointer device and its modifications function as a deflector. As the plow structure moves forwardly through the soil, the surface of the ground is caused to move upwardly by the combined action of the plowshare and the moldboard. This action will result in all matter lying upon the surface of the ground or projecting above the ground as growth in being turned into the furrow in a more or less conventional manner and then covered by earth deflected laterally by the jointer device of this invention. This last mentioned earth is broken up and is projected over the furrow so that substantially all trash and growth turned into the furrow is covered and, likewise, the plowed field is substantially flat rather than deeply ridged as with the usual plowed field. A minimum of work is thus necessary to prepare the field for planting.

Because of the construction of this jointer device and the manner of its attachment to the plow, several advantages will be enjoyed in the operation of this invention. Because the jointer device is mounted on the top edge of the plow, the plow itself will not ride out of the ground. In addition, trash is prevented from gathering on the plow beam. Because of its simple construction, the present jointer device may be effectively used in stony soil. In addition, heavy and bulky trash is readily turned under without any plugging. Furthermore, the jointer device disclosed in this invention will operate effectively at any speed of operation of the plow or at any depth at which the plow is used. The simple method of attachment of the jointer device renders this jointer device readily attachable to almost all makes of plows. Because the position of the jointer device may be readily adjusted up or down, the jointer may be positioned to handle only enough dirt to do the desired covering job. And if the dirt should be thrown too high or out of the furrow, this may be readily adjusted by adjusting the set screw located at the top of the bracket.

It will be understood that, while reference is made to the device operating at any plowing speed, the plow necessarily moves at a rate that will cause earth to climb up to the jointer device and that at fairly high rates of movement of the plow, such rates being common with tractor operation, the earth reaching the jointer device will be broken up to a fine state and thrown out laterally in the form of a spray of earth particles thus to cover the trash and growth in the furrow and to provide an almost pulverized surface layer on the field that has a leveling effect and which inhibits loss of moisture.

The concavity of the plate forming the principal part of the device in both vertical and horizontal planes assists in obtaining the results referred to.

A device according to the present invention costs only about one-third as much as a conventional coulter or disc type jointer and is much easier to attach to a plow.

It will be understood that this invention is susceptible to modification in order to adopt it to different usages and conditions and, accordingly, it is desired to comprehend such modifications within this invention as may fall within the scope of the appended claims.

What is claimed is:

1. A jointer device for a moldboard plow, said jointer comprising an elongated curved deflector plate having its front edge in continuation with the cutting edge of the plow, a bracket for securing said deflector to said plow, means on said bracket for varying the angle formed by the leading edge of the deflector plate with the cutting edge of the plow, a sod cutter comprising a curved blade portion attached to said deflector plate and extending outwardly and angularly of said deflector, the cutting edge of said sod cutter being spaced outwardly of the lower edge of said deflector plate.

2. A jointer device for a moldboard plow comprising a deflector plate having its forward portion substantially flush with the furrow side of the plow and the rearward portion curving outwardly of the furrow side of the plow, the furrow face of said deflector plate being substantially flat at the forward portion and increasing in curvature toward the rear of the deflector, and a sod cutting blade portion attached to said deflector plate and extending angularly from the rearward portion of the furrow side of said deflector plate, said blade forming an integral part of said deflector plate.

References Cited in the file of this patent
UNITED STATES PATENTS

| | | |
|---|---|---|
| 362,023 | Lowden | Apr. 26, 1887 |
| 874,597 | Jarrell | Dec. 24, 1907 |
| 950,674 | Parks et al. | Mar. 1, 1910 |
| 1,004,803 | McDaniel | Oct. 3, 1911 |
| 1,072,838 | Downing | Sept. 9, 1913 |
| 1,890,261 | Miller | Dec. 6, 1932 |
| 2,672,805 | Longenbach | Mar. 23, 1954 |